US011442010B2

(12) United States Patent
Schasfoort

(10) Patent No.: US 11,442,010 B2
(45) Date of Patent: Sep. 13, 2022

(54) MEASURING SYSTEM, SUCH AS AN INTERACTION MEASURING SYSTEM AND A MEASURING METHOD

(71) Applicant: Ibis Technologies B.V., Enschede (NL)

(72) Inventor: Richard Bernardus Maria Schasfoort, Haaksbergen (NL)

(73) Assignee: Ibis Technologies B.V., Enschede (NL)

( * ) Notice: Subject to any disclaimer, the term of this patent is extended or adjusted under 35 U.S.C. 154(b) by 0 days.

(21) Appl. No.: 16/701,866

(22) Filed: Dec. 3, 2019

(65) Prior Publication Data
US 2020/0103343 A1    Apr. 2, 2020

Related U.S. Application Data

(63) Continuation of application No. 14/894,809, filed as application No. PCT/EP2013/060938 on May 28, 2013, now abandoned.

(51) Int. Cl.
*B01L 3/00*      (2006.01)
*G01N 35/08*    (2006.01)
(Continued)

(52) U.S. Cl.
CPC ...... *G01N 21/553* (2013.01); *B01L 3/502715* (2013.01); *B01L 3/502738* (2013.01);
(Continued)

(58) Field of Classification Search
USPC .............. 422/73, 81, 82.05, 68.1; 436/10
See application file for complete search history.

(56) References Cited

U.S. PATENT DOCUMENTS

| 3,047,367 A | 7/1962 | Kessler |
| 3,109,713 A | 11/1963 | Ferrari et al. |
| 2009/0213383 A1 | 8/2009 | Ly et al. |

FOREIGN PATENT DOCUMENTS

| EP | 1000342 B1 | 5/2000 |
| JP | 2006242912 | 9/2006 |

(Continued)

OTHER PUBLICATIONS

"Surface Plasmon Resonance Imaging Studies of Protein-Carbohydrate Interactions"; Emily A. Smith, et al.; J. Am. Chem. Soc. 2003, 125, pp. 6140-6148 (Apr. 26, 2003).

*Primary Examiner* — Dean Kwak
(74) *Attorney, Agent, or Firm* — McDonnell Boehnen Hulbert & Berghoff LLP

(57) ABSTRACT

The present invention relates to a method for the measurement of at least one sample by the interaction with the surface in the field of at least one sensor surface, such as surface plasmon resonance measurement, comprising the steps of: i) sampling the sample and a buffer; ii) transporting the sample and the buffer to at least one flow cell which is in liquid contact with the sensor surface of at least one sensor for measuring a parameter of a sample by interaction of the sample at the sensor surface in the field of the sensor surface; iii) transporting the sample into the flow cell into contact with the sensor surface; iv) handling a separation fluidum by inserting and/or removing the separation fluidum by between the sample and the buffer upstream and/or downstream of the sensor surface; v) measuring the interaction of the sample at the sensor surface; and vi) dispensing the sample from the flow cell, and to a measuring system for such method.

11 Claims, 14 Drawing Sheets

Figure 5:
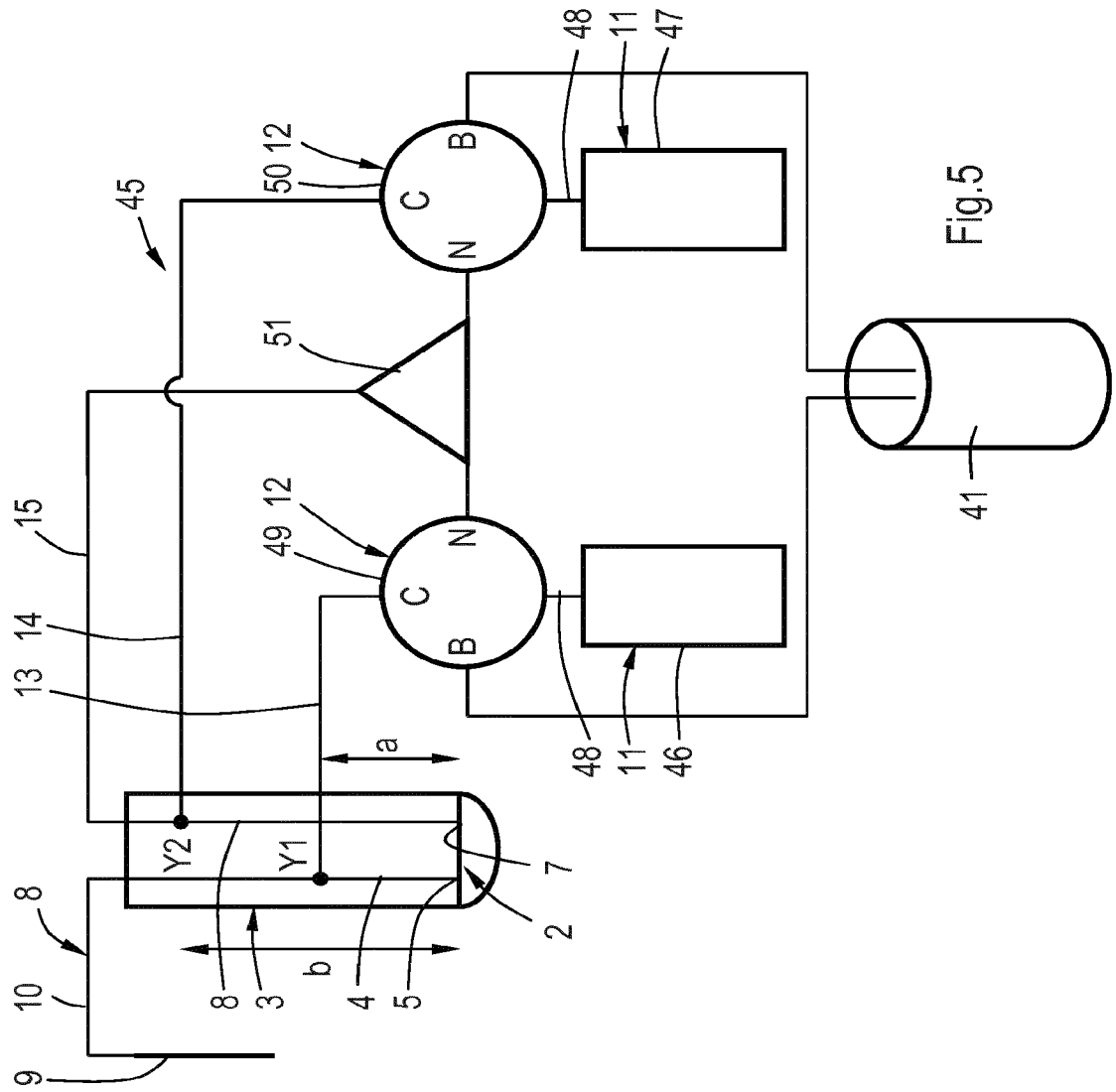

(51) Int. Cl.
*G01N 35/10* (2006.01)
*G01N 21/552* (2014.01)
*G01N 21/05* (2006.01)

(52) U.S. Cl.
CPC .............. *G01N 21/05* (2013.01); *G01N 35/08* (2013.01); *G01N 35/1095* (2013.01); *B01L 3/502784* (2013.01); *B01L 2300/0663* (2013.01); *B01L 2300/0877* (2013.01)

(56) References Cited

FOREIGN PATENT DOCUMENTS

| | | |
|---|---|---|
| WO | 2004109295 A1 | 12/2004 |
| WO | 2012/045325 | 4/2012 |

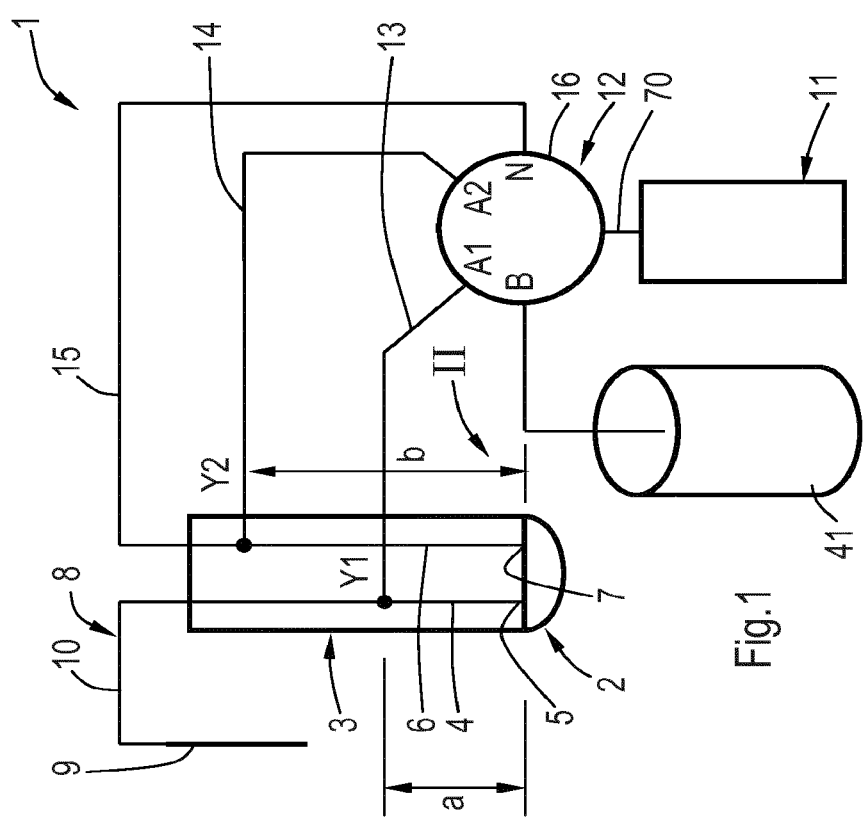

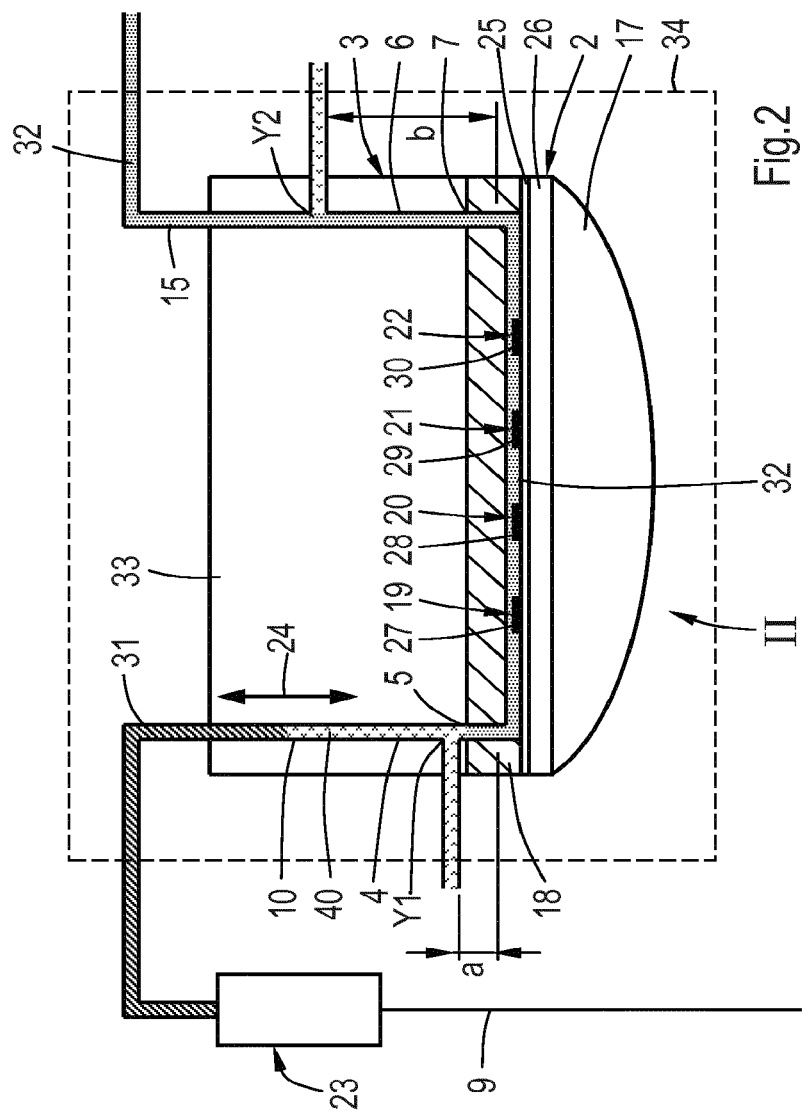

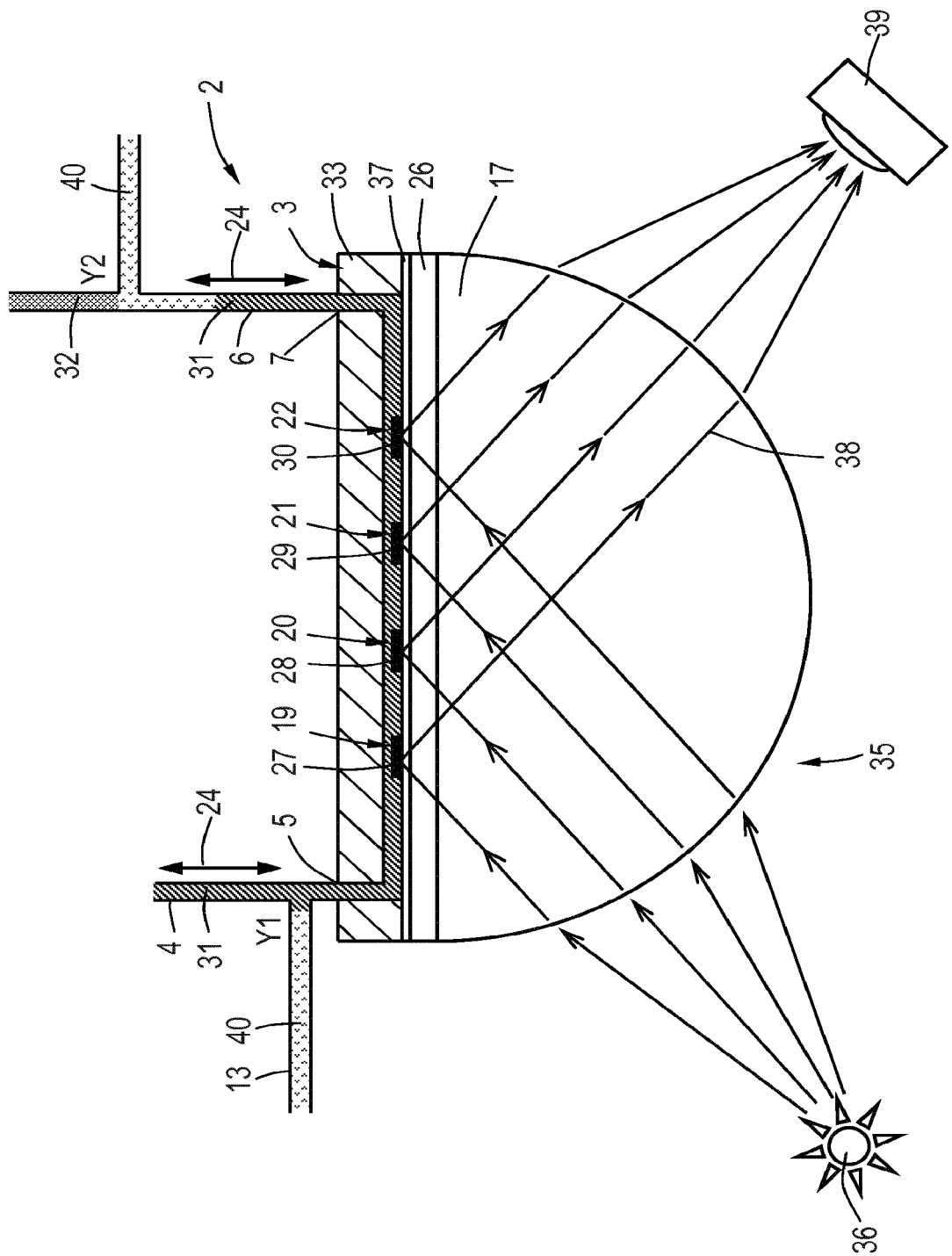

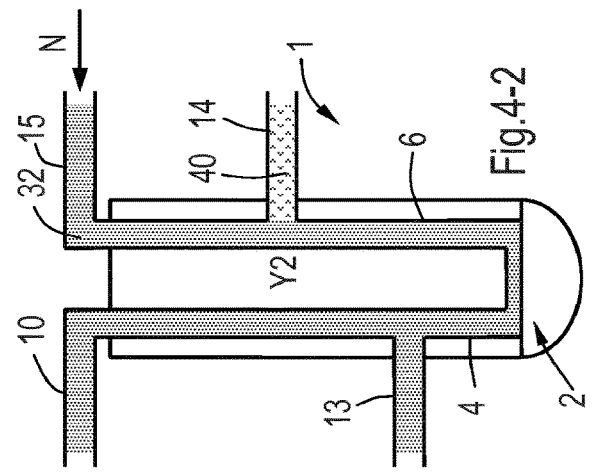
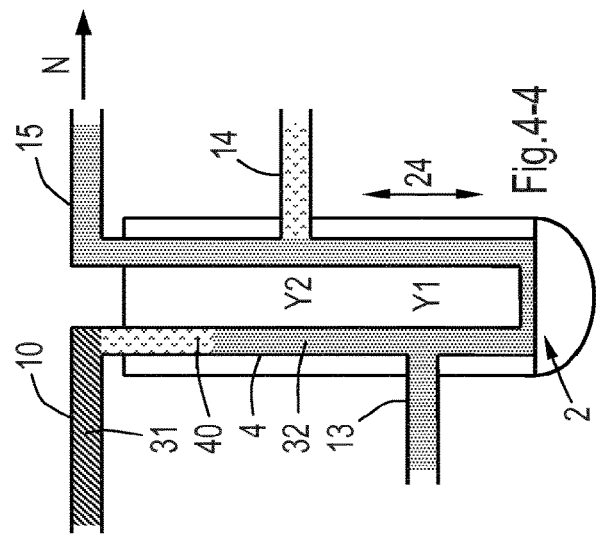
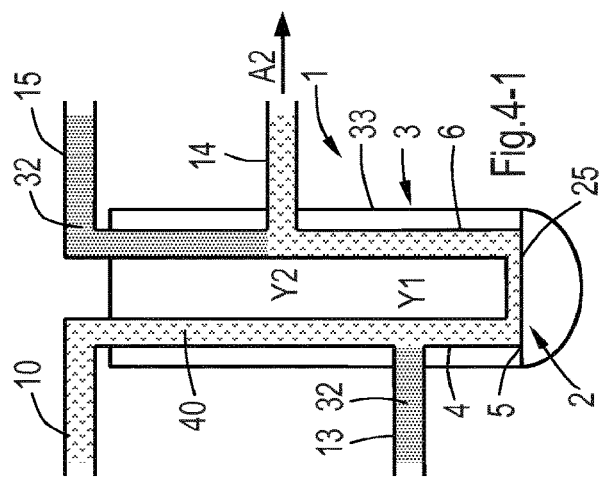
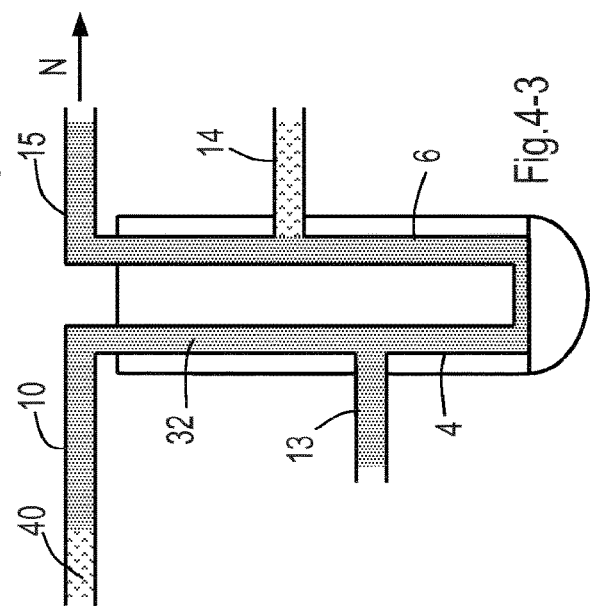

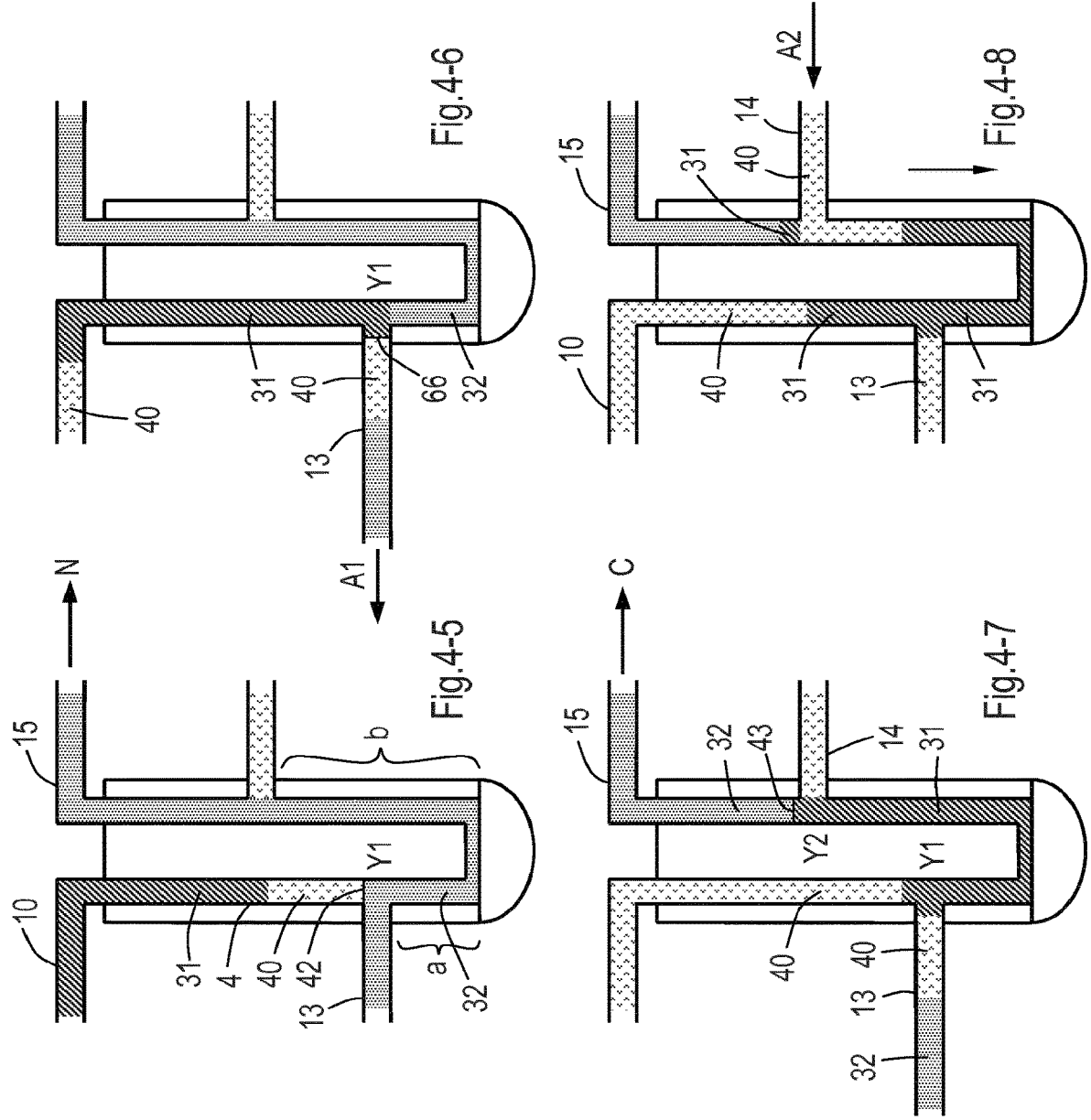

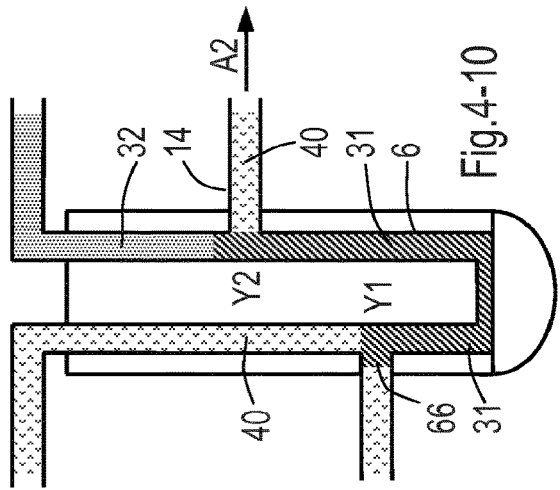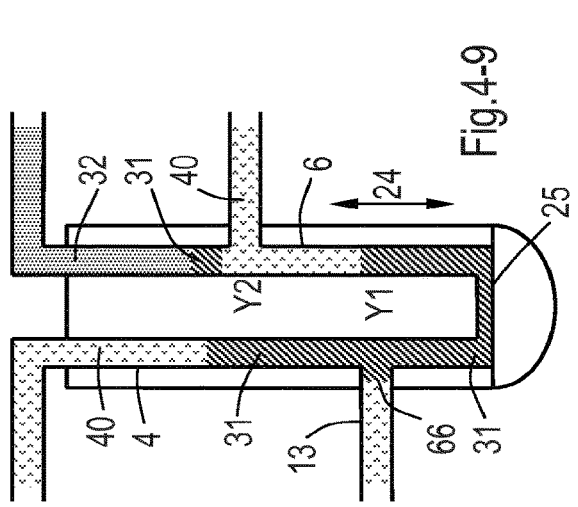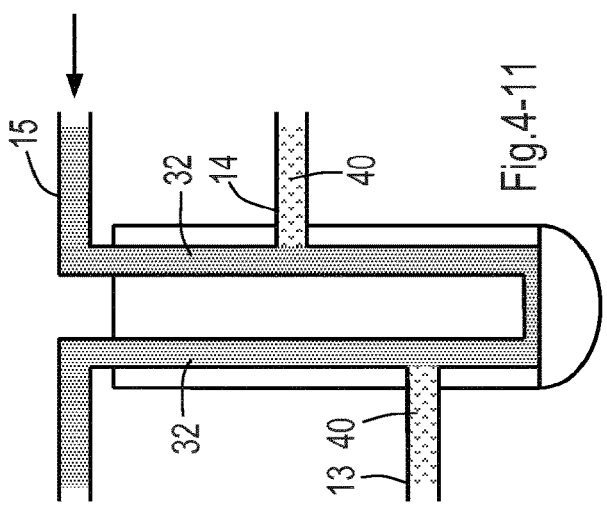

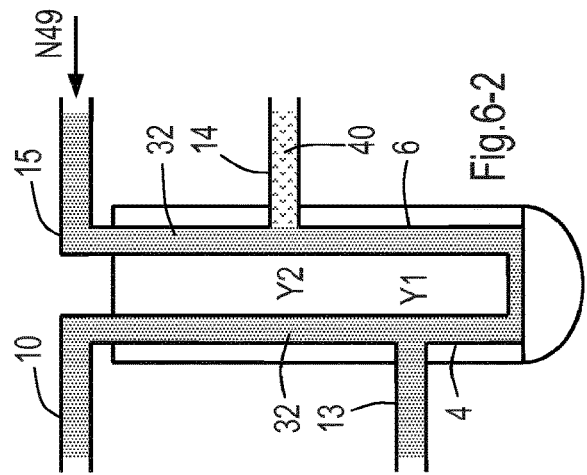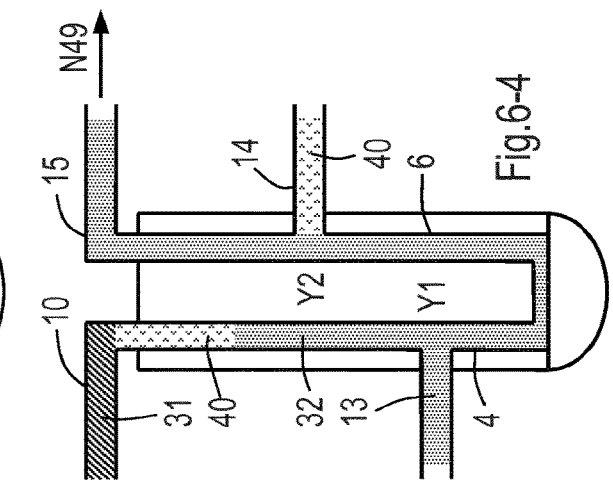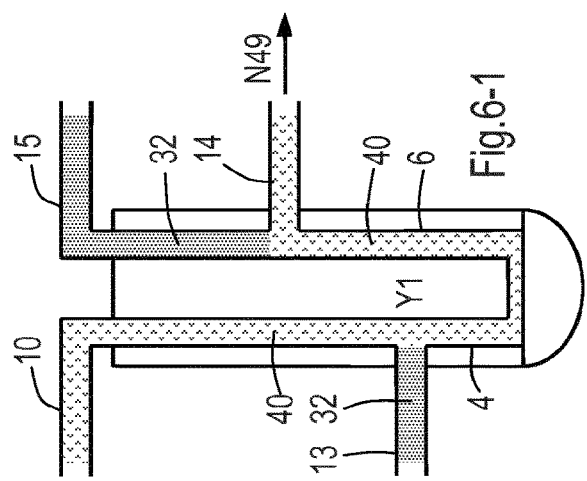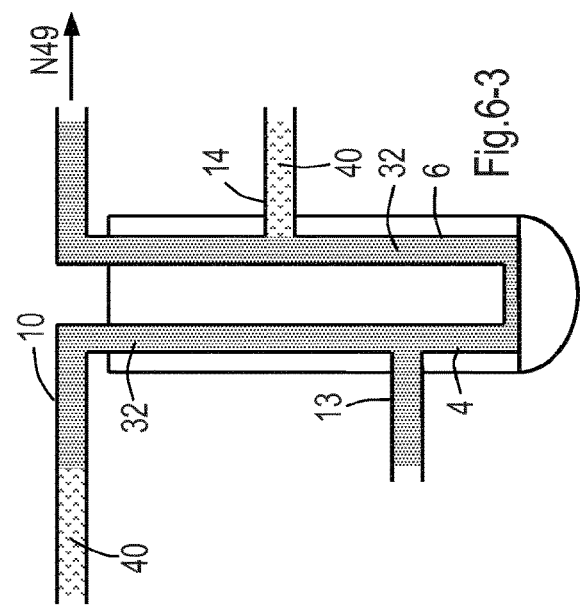

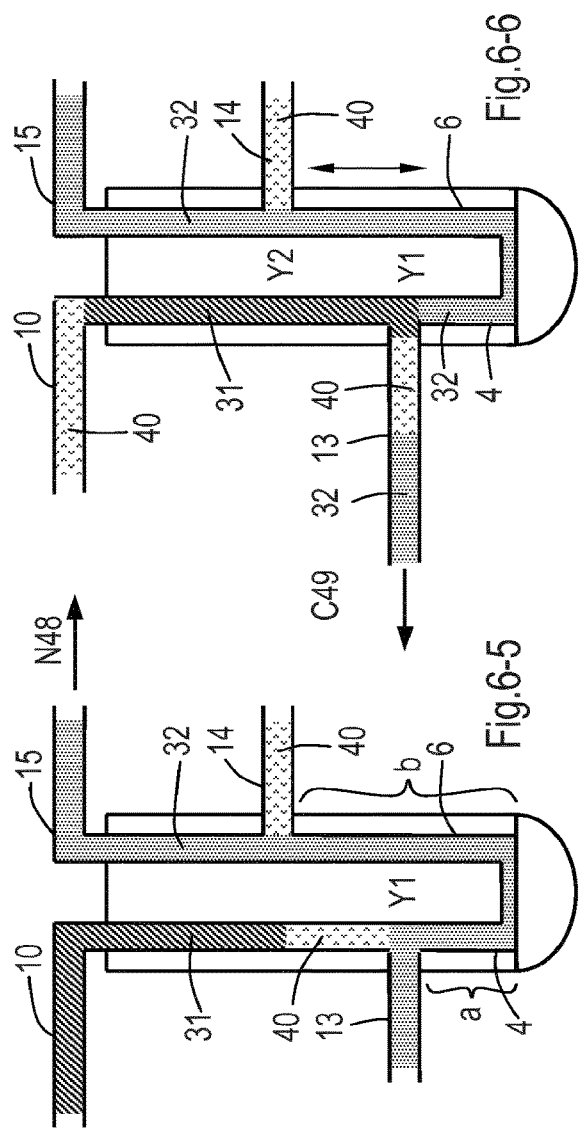
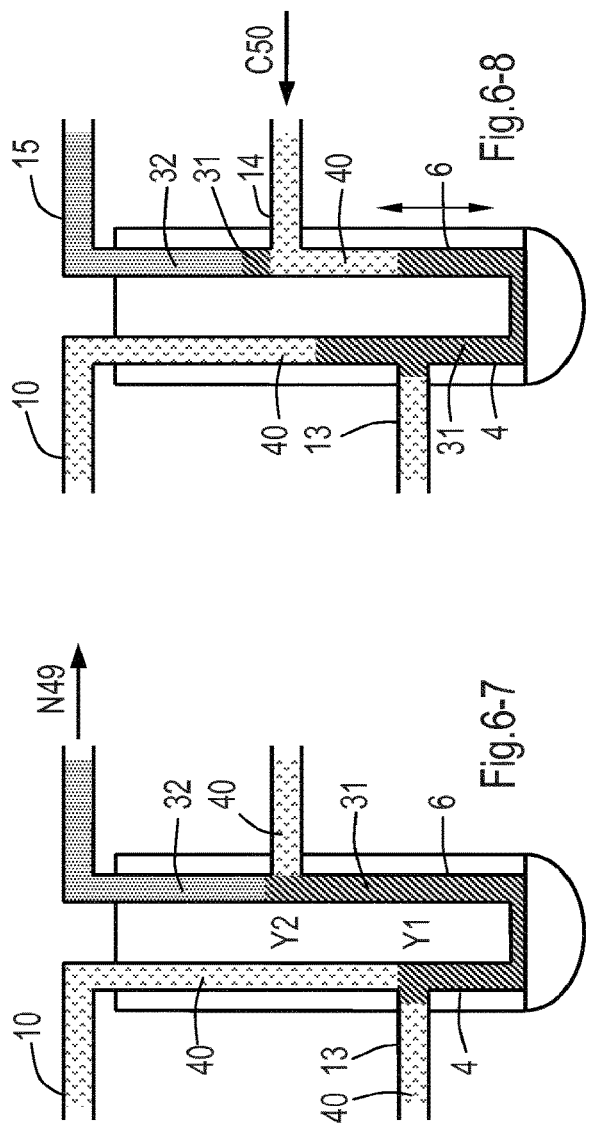

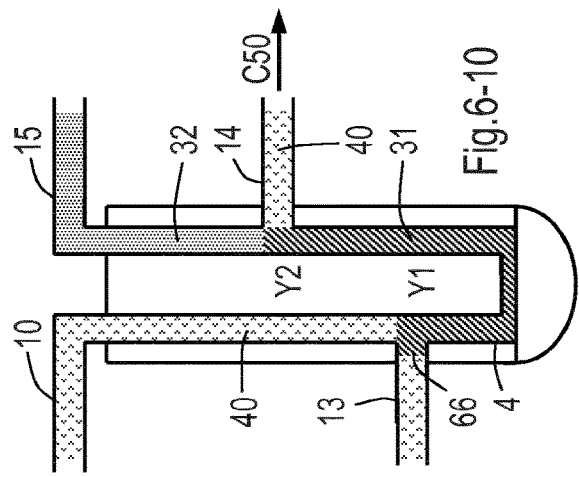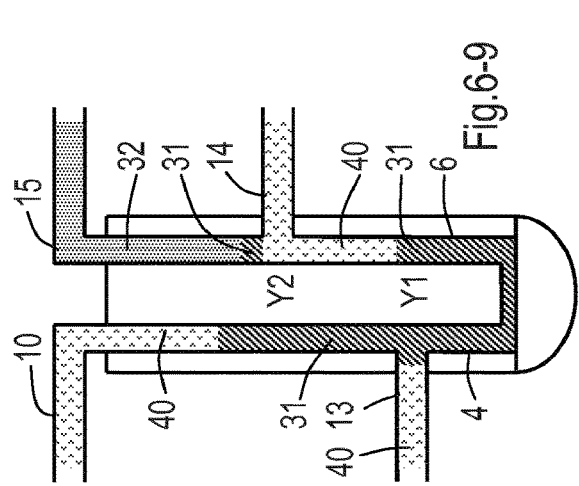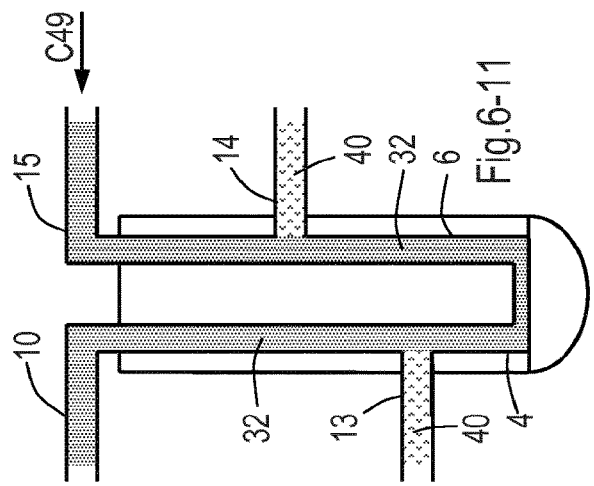

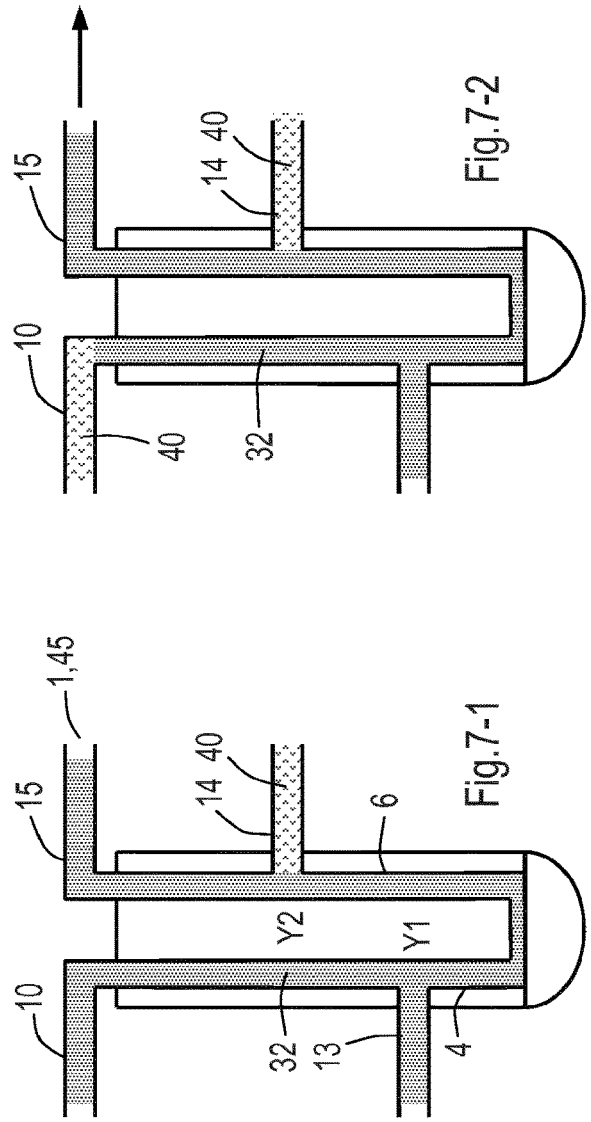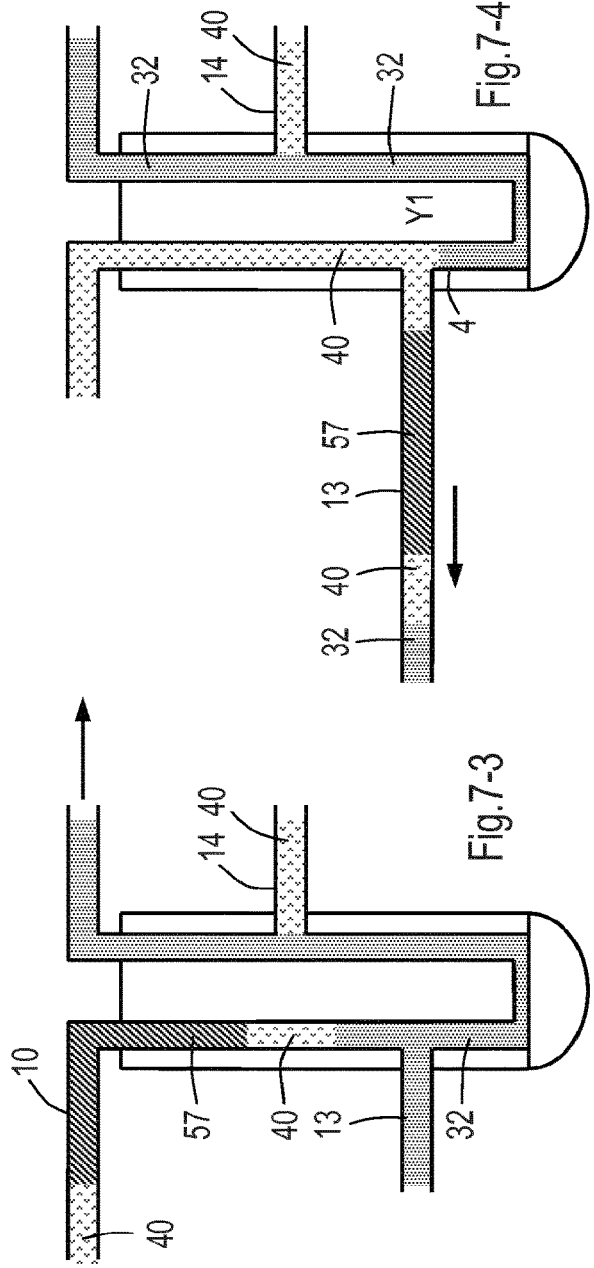

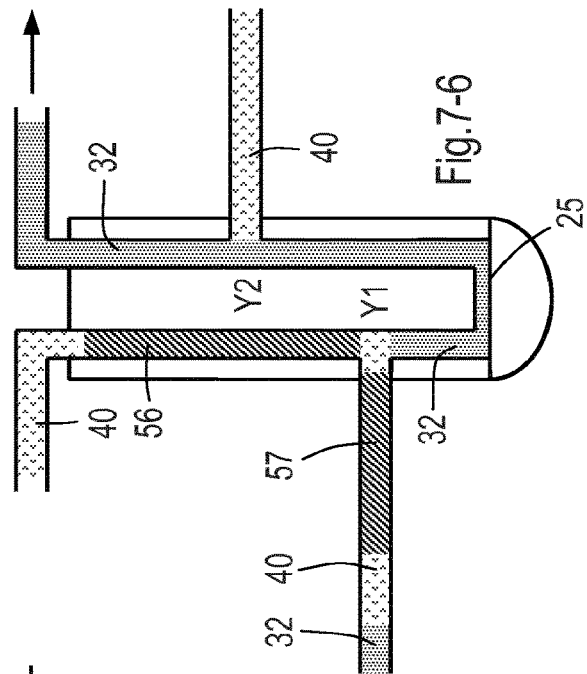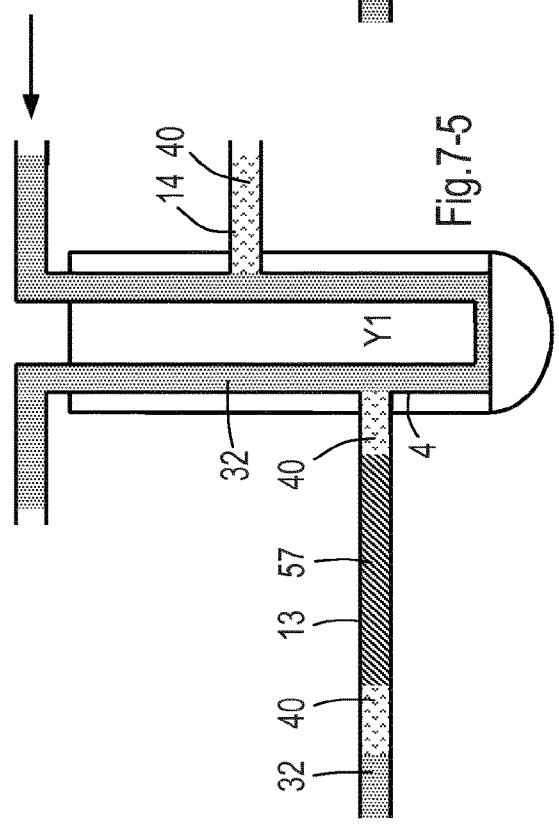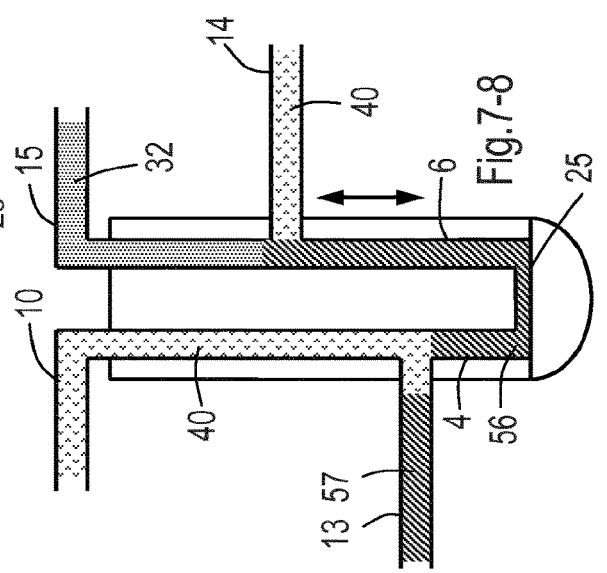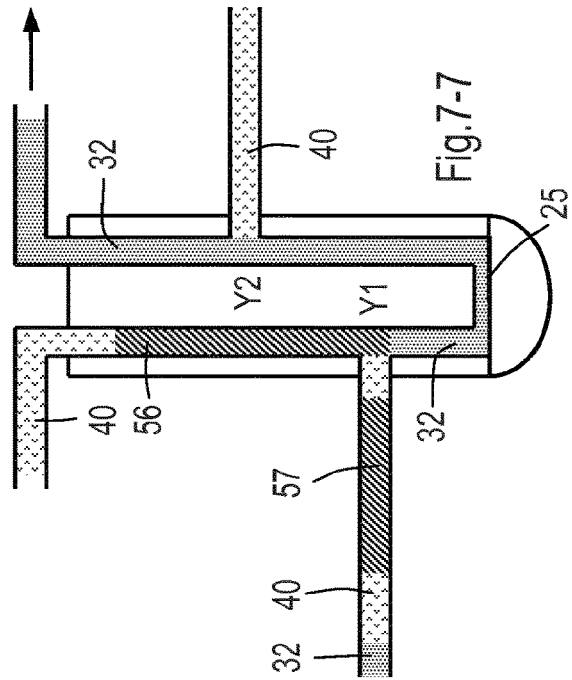

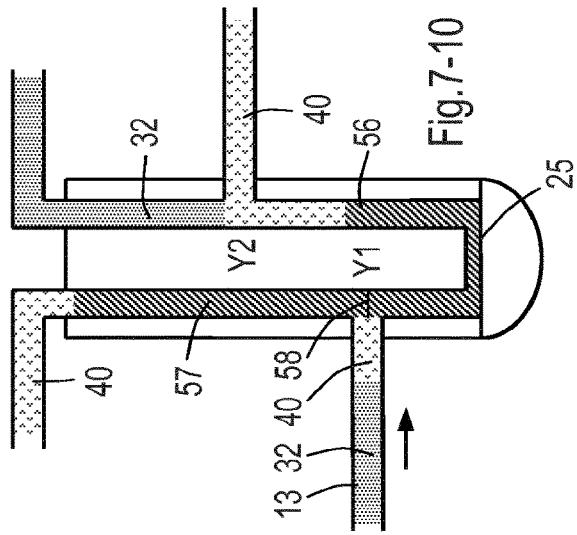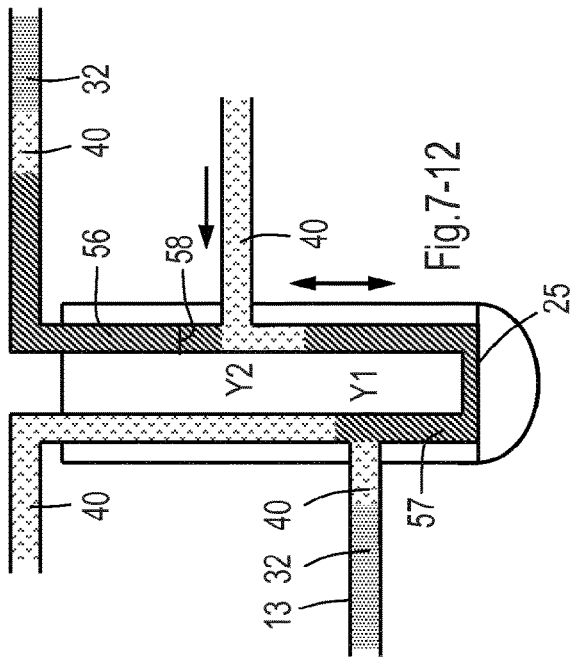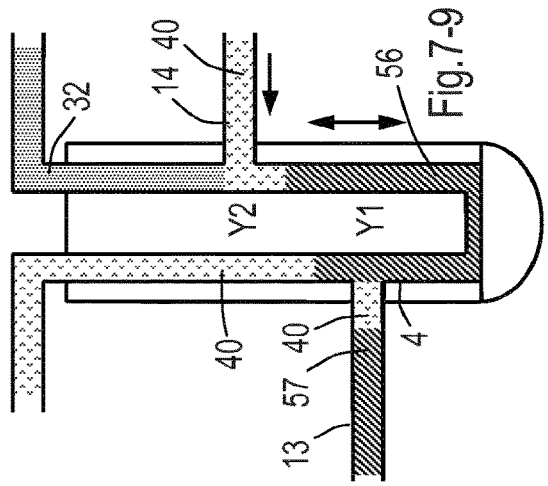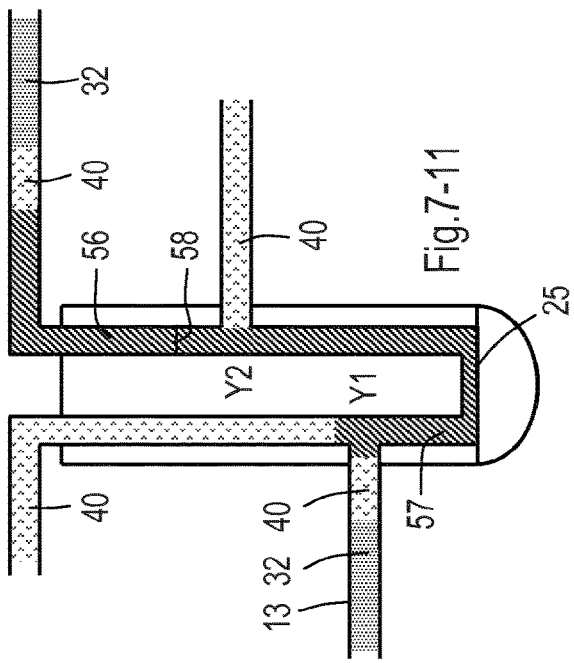

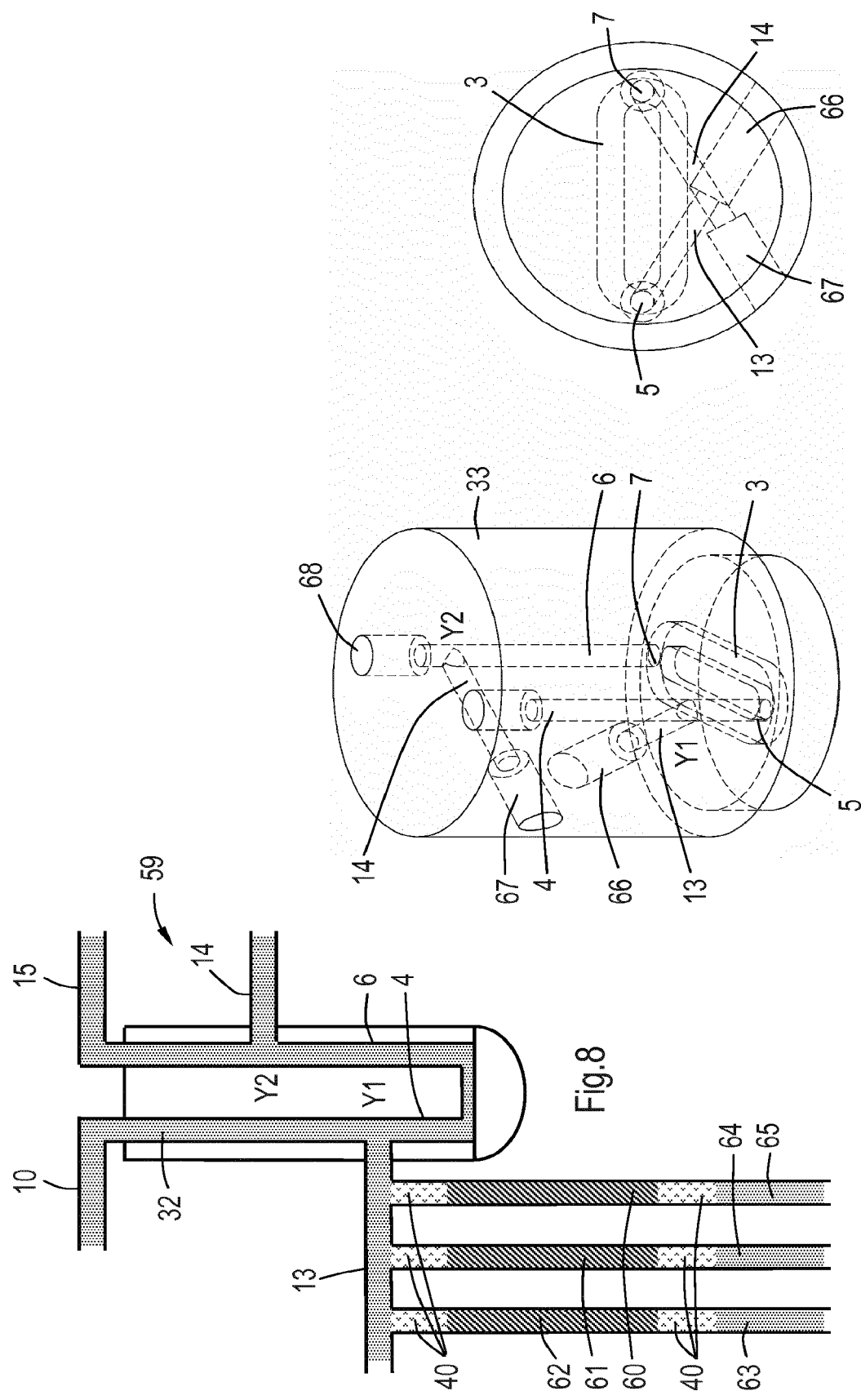

MEASURING SYSTEM, SUCH AS AN INTERACTION MEASURING SYSTEM AND A MEASURING METHOD

CROSS REFERENCE TO RELATED APPLICATIONS

The present application is a continuation of application Ser. No. 14/894,809, filed Nov. 30, 2015, which was a national stage entry of PCT/EP2013/060938, filed 28 Mar. 2013. The full disclosures of PCT/EP2013/060938 and Ser. No. 14/894,809 are incorporated herein by reference.

The present invention relates to a measuring system, such as an interaction system, and to a measuring method, such as for interaction measurement, for the measurement of a sample, such as a label free sample. In particular, the present invention relates to the handling of the separation fluidum in view of interferences of a separation fluidum separating the sample from a buffer, with the measurement and/or with the sensor surface of the measuring system.

A label free measurement is possible with various detection systems such as SPR. SPR is an optoelectronic technique for detecting interactions at a thin metal film. Polarized light is shone through a prism onto a thin metal film applied on the prism. The angle of incidence is changed and the intensity of the reflected light is monitored using an optical unit. The intensity of the reflected light passes through a minimum due to excitation of so called surface plasmons. The angle at which maximum loss of the reflected light intensity occurs is called the SPR angle. The SPR angle is dependent on the refractive index of the medium present on the metal surface and, thus dependent on the accumulation or desorption of molecules such as proteins on the thin metal layer.

SPR is predominantly used for measuring the shift in the SPR angle, which is due to the occurrence of (bio) molecular and/or cellular interaction at the sensor surface. Thus, (bio) molecular interactions may be studied in real time.

SPR sensors are generally not selective in relation to the molecular interaction of the target compound. Because the changes in the surface plasmon resonance angle of light incidence at the sensor surface may be due to differences in the medium, such as the composition and concentration of the buffer, due to absorption of non-target material on the surface, and also to for instance the temperature.

Selectivity may be achieved by modifying the sensor surface by binding ligands which selectively capture the target compound. Common mode effects like temperature differences and bulk changes in the surface plasmon resonance angle of light incidence at the sensor surface can be compensated by using a channel or spot where specific bio-molecular interactions do not occur. It is preferred that the SPR measurement is carried out while the buffer or sample continuously flows along the sensor surface for setting a hydrodynamic flow profile and for reducing mass diffusion relative to the sensor surface.

Non-specific binding of non-target compound or components may still take place, thereby it is preferred that the SPR measurement comprises a first association step by continuously flushing the sample solution along the sensor surface, followed by a dissociation step in which continuously buffer solution or another solution is flushed along the sensor surface, thereby dissociating non-target compound while the target compound remains bound to the specific ligands adhered to the sensor surface. If partial dissociation of the target compound also may occur then correction would be possible by measurement of appropriate references.

The SPR measuring system comprises generally a source for polarized light that shines via a prism onto the sensor surface. The reflected light is monitored using an optical unit, such as a photo diode or camera. When using a camera it is possible to monitor real time and separate and individual parts of the sensor surface at which the same or different ligands are adhered to the sensor surface. Hereby it becomes possible to real time and at the same time measure for different target compound in one and the same sample.

An optical label free detection system is using an optical path for guiding at least part of the beam of light and a detector for detecting an optical characteristic of the light having propagated along the optical path. The optical path comprises a multimode interference structure, the multimode interference structure being arranged for providing a propagation of the beam of light in at least two propagation modes. The detector is positioned so as to receive light from each of the at least two propagation modes. EP-A-1 000 342 discloses a detector device having such an interferometer. A light beam is split in a measurement beam guided along a measurement path and a reference beam guided along a reference part. A fluid to be tested is guided along the measurement part, thereby the fluid interacting with the light propagating through the measurement part. The measurement beam having propagated along the measurement path and the reference beam having propagated along the reference path, are formed into divergent light beams which interfere and overlap, and form an interference pattern on a detector, such as a CCD array.

Another label free detection system comprises the quartz crystal microbalance (QCM) system. The QCM system comprises is a sensitive balance capable of measuring changes in mass at a molecular level. A quartz crystal vibrates at its resonance frequency by the application of an AC potential. The binding of a sample will result in a change of the vibration frequency. This change in frequency is used to characterize real-time, label-free the interaction of the sample with the sensor surface. Measuring this frequency change enables the characterization of the interaction of the sample with the sensor surface, i.e., the quartz crystal.

Still another label free detection system comprises surface acoustic wave (SAW) system. The SAW system comprises a sensor chip of which the chip surface is excited to oscillate acoustically by acoustic waves are generated in a piezoelectric unit. A sample binding the sensor chip results in a modified oscillation. Mass changes at the sensor chip surface will result in a wave shift, and viscoelastic and conformational changes will result in a change in wave amplitude.

The invention is thus suitable for incorporating any detection system, such as a label free detection system, in which sample induced changes at the sensor surface in the evanescent or acoustic field thereof, can be measured without making contact with the sample. But the invention is also suitable for incorporating detection systems detecting a label of the sample.

The sensor surface may be provided with a ligand which is generally a biological element, such as a tissue, a microorganism, an organelle, a cell receptor, an enzyme, an antibody, an antigen, protein, DNA, RNA, peptide or other biologically active compound.

The flow cell consists generally of a confined space formed in a support, which is applied onto the sensor surface thereby forming the flow cell. The flow cell is connected to a sampling system for aspirating or dispensing buffer, sample or other relevant liquid such as a regeneration solution. Liquid transport means are also present in order to transport a flow of liquid. Preferably the measurement is carried out under maintained liquid flow. Accordingly, this substantially avoids that local changes in composition, concentration, pH and the like will result in a change in the evanescent or optical field of the sensor surface. Moreover the maintained liquid flow sets the hydrodynamic condition of the biomolecular interaction characterized by a fixed so-called stagnant layer. The stagnant layer is a theoretical layer thickness where transport of biomolecules occurs only by diffusion. When the flow velocity is high the stagnant layer is low and vice versa. Preferably, the measurement not only comprises, as stated above, a first association step followed by a dissociation step. Obviously a pre-accommodation step and/or a last regeneration step may also be included.

The measuring system is also suitable for measuring two or more samples consecutively without intermediate contact of the sensor surface with buffer or separation fluidum.

Generally, under flushing conditions, the measurement may take place during 1 second to 1 day, or preferably 30 seconds to 3 hours, such as 1 minute to 10 minutes. The measuring time is inter alia dependent on the concentration of the target compound and/or the reactivity of the ligand and the applied flow conditions.

The flow cell may have a flow cell volume ranging from 1 nl to 1 ml, such as 10 nl to 10 ml, like 100 nl to 500 µl, like 10-100 µl dependent on selectivity and sensitivity of the measurement.

The sample and buffer may be separated by a separation fluidum which may be any suitable fluidum that is capable of separating sample and buffer during the transport and measurement of the sample and of the buffer, and substantially avoid any contact and mixing between the sample and the buffer during their measurement and during the transport. This is particularly important when the measurement is carried out over an extended time period, such as one minute to 24 hours, and preferably during several hours. Accordingly, it is preferred that the separation fluidum is a gas, such as air, or a liquid substantially immiscible with sample and buffer. Suitable liquids are saturated and unsaturated hydrocarbons (alkanes) organic and mineral oils and other non-polar, water immiscible solvents. Examples of these liquids are hexane, octane, decane, hexadecane, halogenated hydrocarbons, silicon oil, etc.

When it is important that the sample is measured under back and forth flow of sample and/or of buffer at the sensor surface then sample and buffer should maintain substantially separated by the separation fluidum to prevent mixing of sample with the buffer. Even a migration of sample or buffer along the wall of the tubing towards and into the flow cell should be substantially avoided.

When the buffer and the sample are transported over a short and narrow path to the sensor surface, then mixing of sample and buffer may have a minor or no effect on the measurement and buffer and sample may be transported without being separated by the separation fluidum. Otherwise, sample and buffer need to be separated by separation fluidum during transport. However, further research has found that when the separation fluidum is passed over the sensor surface, small bubbles or droplets of the separation fluidum may be trapped at the sensor surface which has a negative impact on the response (spikes) and sensitivity of the sensor surface. The entrapment of these small bubbles or droplets may be increased when the sensor surface is more hydrophobic. The entrapment may be reduced or avoided by the addition of a detergent to the buffer and to the sample. However, under many circumstances, the samples comprise proteins such as membrane proteins, under which circumstances a detergent cannot be applied and often parts of the sensor surface are hydrophobic enhancing the entrapment of small bubbles or droplets. When the separation fluidum is passed over the sensor surface, the fluidum passage affects not only the signal by adding spikes to the signal, but also interferes with the bound compounds. When cells are bound to the surface the separation fluidum will destroy the layer by dragging the cells from the surface and therefore the separation fluidum should be withhold of making contact with the sensor surface. In addition, during long time measurement, particularly under liquid movement for avoiding differences by diffusion, it is recommendable to have downstream of the sensor cell the sample separated from the buffer by a separation fluidum.

Accordingly, there is a need of a measuring system and method of measurement for measurement of a sample, with or without a label, which combines on the one hand the avoidance of mixing of sample and buffer by the use of a separation fluidum, and on the other hand a universal use of any measuring system or method, and preferably without the required addition of additives to the sample and buffer, or adaptation of the sensor surface, in order to reduce the effect of the separation medium on the sample measurement.

According to a first aspect of the present invention does provide a measuring system, such as an interaction measuring system, for measurement of at least one sample, comprising:
  i) at least one sensor having at least one sensor surface;
  ii) at least one flow cell which is in liquid contact with at least the sensor surface, and having an inlet connected to an inlet port of the flow cell, and an outlet connected to an outlet port of the flow cell;
  iii) a detection unit for measuring at least one parameter of the sample caused by interaction of the sample at the sensor surface in the field of the sensor surface;
  iv) sampling means for supplying at least one sample and a buffer to the sensor surface;
  v) liquid transport means for liquid transport, and connected to the inlet and the outlet of the flow cell; and
  vi) means for handling separation fluidum upstream and/or downstream of the sensor surface, and connected to the inlet and/or the outlet of the flow cell.

The present invention is based on the insight that any effect of the separation fluidum on the sensor surface may be overcome by removing the separation fluid from in between the buffer and the sample, so that after the buffer the sample is directly entered into the flow cell and into fluid contact with the sensor surface. Although there is formed a direct contact between sample and buffer, a mixing of sample and buffer is substantially minimized due to the short distance over which the liquid is transported into the flow cell and the sample is in fluid contact with the sensor surface, and that the liquid volume transported is small as well as the transport velocities. When the distance between the sampling inlet and the sensor surface is short as well as the transported liquid volume, than the sample may be transported towards the sensor surface without an inserted separation fluidum. Preferably, for universal applications, such as when using longer interaction times, a separation fluidum is inserted between sample and buffer during measurement after injection of the sample. By means of the handling means according to the invention, the separation fluidum may be removed from in between the sample and the buffer upstream of the flow cell, where after the measurement can be carried out with the sample in contact with the sensor surface. As mentioned above, the sample may carry a label or may be label free. During the interaction measuring process after injection, the same handling means can be used for the reinsertion of the separation fluidum in between the sample and the buffer downstream of the sensor surface. In this way the measurement of sample and buffer is universally possible without mutual interference. After injection of the sample the inserted separation fluidum prevents the diffusion of sample into the buffer and the sample maintains its concentration also during e.g. hours of interaction measuring time. In this way the separation fluidum prevents mixing or diffusion of sample and the buffer during a long exposure and interaction process of the sample with the sensor surface. Only during a short injection period the mixing or diffusion between sample and buffer can take place. The reinsertion of the separation fluidum after the injection of the sample can be tuned to the front of the sample by pinching off the mixing/diffusion region of the sample buffer interface. In this way there may be some loss of sample but the concentration of the sample or analyte will not be changed because of the direct contact of sample and buffer during injection. The removal and/or reinsertion of the fluidum takes place without the use or contact between the sample and valves and the like, so that any contamination of sample and buffer with former samples or buffer is avoided and the system is less complex in control of the various steps of the claimed method.

It is noted that the part of the measuring system extending between the sampling means and the sensor surface is referred to as the upstream part of the system, and the downstream part of the measuring system extends between the sensor surface and the valve means and/or liquid transportation means.

According to another preferred embodiment of the measuring system the downstream handling means for handling the separation fluidum downstream of the flow cell comprise an outlet air parking line connected at a connection (Y2) to the outlet and via valve means to the liquid transport means.

Such connection Y2, at some distance from the outlet port of the flow cell provides for a reliable and elegant insertion and/or removal of separation fluidum, parking of an additional sample. Generally, the connection also provides for the use of back and forth movement during measurement and avoidance that separation fluidum contacts the sensor surface. Accordingly, the present invention provides the possibility of reinserting a separation fluidum in between the buffer and sample downstream of the sensor surface of the flow cell, and for a removal of separation fluidum from in between the buffer and the sample, such as before dispensing the sample and buffer. Thereto, these downstream handling means comprise an outlet air parking line connected at a connection Y2 to the outlet of the flow cell. Before injection of the sample into the flow cell, the air parking line connected to Y2 can be filled initially with separation fluidum. Filling can be carried out via the flow cell, or via the valve means. The downstream handling means are via valve means connected to the liquid transport means. Accordingly, on actuating the valve means liquid transport means may remove separation fluidum from the buffer and the sample or reinsert separation fluidum in between the buffer and the sample. Obviously, in order to avoid the presence at the interface of buffer and sample, the downstream handling means may remove not only separation fluidum but also some buffer and some sample in order to have a reliable interface of only buffer and sample. It may be costs and control effective when common liquid transport means are used for both the upstream and downstream handling means.

The measuring system may comprise means for generating a back and forth flow during measurement at the sensor surface. Thereby hydrodynamic flow conditions are maintained during the measurement. In order to avoid undesired mixing of the sample with the buffer at their interface, which mixing would affect the measurement, a separation fluidum is inserted between the sample and the buffer. Thereby, the undesired mixing is substantially avoided.

Due to the back and forth movement the transport of the sample comprising a target compound that is to bind to a ligand onto the sensor surface is not influenced by a changing average stationary liquid film layer but only of the diffusion rate of the target compound from the sample through the stationary liquid film layer present in the evanescent field on the sensor surface. Accordingly, during each measurement which can take place up to about 24 hours substantially the same conditions are maintained. For making use of the back and forth movement of liquid in the measuring system, the system according to the invention comprises means for the back and forth movement of the liquid, and a distance (b) of the connection Y2 to the outlet port of the flow cell is such that during the back and forth movement the separation fluidum will not contact the sensor surface. The distance (b) of the connection Y2 to the inlet port of the flow cell is sufficiently far away, so that is avoided that due to the back and forth movement the reinserted separation fluidum may still contact the sensor surface. Reinsertion of the separation fluidum via the outlet air parking line and Y2 is in the direction of the flow cell and therefore Y2 is at a distance (b) from the sensor surface, so that a direct connection to the flow cell (with b=0) will complicate the operation of reinsertion the separation fluidum. Practically, it is preferred that the system comprises means for the back and forth movement of the liquid, and a distance (b) of the connection Y2 to the outlet port of the flow cell is such that during the back and forth movement the separation fluidum will not contact the sensor surface. So preferably the volume over the distance (b) is greater than the sum of the volumes of the back and forth flow and the separation fluidum together.

According to a preferred embodiment the handling means comprise upstream handling means comprising an inlet air parking line connected at a connection (Y1) to the inlet, and via valve means to the liquid transport means.

This inlet air parking line may be used for taking up the separating fluidum, such as air from in between the buffer and the sample. The upstream handling means may at the beginning take up some buffer and after the separating fluidum some sample such that there is a reliable contact in between only buffer and sample at the expense of a small amount of sample. The upstream handling means are connected via valve means to liquid transport means, so that when the valve means are actuated for contact with the inlet air parking line, the liquid transport means may take up separation fluidum via the inlet air parking line, or reinsert via the inlet air parking line separation fluidum. It is noted that the connection Y1 may be as construction wise as close as possible to the inlet port of the flow cell, thereby reducing the transport distance and transport volume of the buffer and sample in contact into the flow cell so that any mixing is substantially avoided.

For similar reasons the distance (a) from the connection Y1 to the inlet port of the sensor surface, may be minimal when sample and buffer are not separated by separation fluidum upstream of the sensor surface. The distance (a) is larger and properly selected, such as in view of the back and forth movement during measurement, and/or insertion or removal from separation fluidum between sample and buffer. Accordingly, it is preferred that the sample volume is larger than the liquid volume between the connections Y1 and Y2. In this respect means the term liquid volume, the open space between the connections Y1 and Y2 filled with liquid, such as sample or buffer.

The measuring system according to the invention does not comprise transport loops or injection loops and any valves in between the sampling unit and the flow cell. Valve means are only used in the measuring system according to the invention upstream and downstream of the flow cell, such that the sample is never in contact with the valve and pump means. Thereby is avoided contamination of the valves and pumps by samples measured. In order to have a full control of the liquid transport through the flow cell and out of the flow cell back to the inlet unit of the flow cell, the invention provides for liquid transport means comprising a combined line connected to the outlet of the flow cell. This outlet of the flow cell is generally connected to the connection Y2, preferably downstream of the connection Y2. Accordingly, the entire flow cell can be filled and flushed from the sampling means up to downstream of the connection Y2.

For particular measurements it could be necessary to measure after a first sample immediately a second sample. For instance, using a first sample the sensor surface is provided with a particular biological active entity (compound or cell), the ligand, which is to be reacted with a second sample (analyte) for such an option, the measuring system comprises at least one sample parking line connected to the inlet air park line and/or the outlet park line, and via valve means to liquid transportation means. Preferably the sample parking line is connected to the inlet park line.

A proper liquid transport by the liquid transport means for handling separation fluidum in between or from in between buffer and sample, and for flushing and filling the system with buffer, liquid transport means are used such as pumps and pistons. For each inlet and outlet air parking line, and for the combined line different liquid transport means may be used. The invention provides for various options, in that one or more liquid transport means may be used for serving the air parking lines and combine line. The service may be independent, and separated in different directions for taking up or removing sample, separation fluidum and/or buffer. This is possible by using one or more switch units comprising at least two outlets to be connected the flow cell by the outlet parking line and/or the combined line. When one liquid transport means, such as a pump is used, one switch unit may be used. When two liquid transport means are used, then one or more switch units may be used and may be connected to the flow cell via a common connector.

It is noted that the measuring system may comprise one or more flow cells. Wherein each flow cell may operate under different measuring conditions, such as temperature and the like, and/or comprises different detection units (optical or acoustical). But each flow cell may in turn comprise one or more sensors each having one or more sensor surfaces. Accordingly, different types of measurements and different types of analyte may be measured at the same time.

SPR is the golden standard for detecting in real-time and label free biomolecular interactions of a specific analyte to a ligand that is immobilized on a sensor. For instance the imaging feature of the IBIS MX96 instrument enables to detect e.g. >200 interactions including references simultaneously. A microarray of spotted ligands can be utilized in different and optimized concentrations for analysis. However, not only the concentration but also affinity/avidity can be measured. Such sensor may be used for the comparison and prediction of the status of (pre)clinical, early and established disease in pharmaceutical R&D applications.

Accordingly, it is preferred that the measuring system is an optical evanescent field based measurement system for preferably label free detection of biomolecular interaction e.g. a surface plasmon resonance measuring (SPR) system, and wherein the detection unit is an optical unit for measuring the surface plasmon resonance angle of light incidence at the sensor surface.

Another preferred characteristic feature of the measuring system is that upstream of the sensor 2 the system preferably does not comprise valves or tubing loops which could result in sample contamination and/or dilution.

A second aspect of the invention relates to a method for the measurement of at least one sample by the interaction with the surface in the field of at least one sensor surface, such as surface plasmon resonance measurement, comprising the steps of:
 i) sampling a sample and a buffer;
 ii) transporting the sample to at least one flow cell which is in liquid contact with the sensor surface of at least one sensor for measuring a parameter of a sample by interaction of the sample at the sensor surface in the field of the sensor surface;
 iii) transporting the sample into the flow cell into contact with the sensor surface;
 iv) handling the separation fluidum by inserting and/or removing the separation fluidum between the sample and the buffer upstream and/or downstream of the sensor surface;
 v) measuring the interaction of the sample at the sensor surface; and
 vi) dispensing the sample from the flow cell.

Accordingly, the method according to the invention is based on the same inventive concept of the use of a handling step for separation fluidum by withdrawing the separation fluidum from between the sample and the buffer before the sample enters the flow cell. It is by this added handling step that substantially any contact of separation fluid with the sensor surface is avoided.

According to a preferred embodiment of the method according to the invention, the method further comprises the step of handling separation fluidum by inserting and/or removing separation fluidum between the sample and the buffer downstream and/or upstream of the sensor surface.

Accordingly, it is also possible to insert separation fluidum between sample and buffer downstream but also upstream of the flow cell.

After completion of the measurement with the sample and preferably also after the dissociation step with buffer, the system may be rinsed and cleaned by flushing buffer through the entire system from the downstream side of the flow cell (via the combined line) towards the sample inlet unit of the sampling means. According to one possibility, the dispensing step may be carried out without the prior removal of the separation fluidum from in between the sample and buffer. Then a higher dispensing velocity can be applied for removing the sample. Due to this higher dispensing velocity of the buffer (relative to the transport rate when introducing the sample into the flow cell) the impact of the separation fluidum onto the sensor surface may be minimal. So that substantially no separation fluidum is trapped at the sensor surface. Accordingly, at the high dispensing velocity the system may be washed, cleaned and flushed with buffer through the flow cell towards the sample inlet unit without the prior removal of the separation fluidum. However, if it is preferred that the separation fluidum is not making contact with the sensor surface, then the method according to the invention comprises the additional step of removing the separation fluidum from between the sample and the buffer before the step (vii) of dispensing the sample through and from the flow cell. If the sample and buffer are separated by a separation fluidum upstream of the sensor surface (before the sample is measured) than the method also comprises the step removing the separation fluidum before the sample comes into contact with the sensor surface for measurement of the sample.

As mentioned and discussed above it may be preferably that the measurement is carried out under back and forth movement of the sample, such that buffer or separation fluidum do not contact the sensor surface.

The method according to the invention also provides for the immediate measurement of a second sample after a first sample without any intermediate contact of the sensor surface with the buffer. In such a case it may be advantageous that at least one additional sample is inserted directly after the first sample and separated by separation fluidum from the buffer. Accordingly, it is possible that the additional sample (but also the first sample and buffer) have been present during a sufficient period of time in a thermostatic unit so that the samples and buffer all have the desired temperature prior to the measurement.

For a reliable and rapid measuring system for measuring a sample relative to a buffer, it is very convenient when the sampling means and liquid transportation means comprise a microchannel, such as a tubing, connected to the flow cell for taking up and transport buffer and sample optionally separated by separation fluidum.

For a reliable and simple generation of the back and forth flow conditions, it is preferred that the sampling means comprises a tubing or microchannel connected to the flow cell and to the back and forth flow means. Accordingly, the same tubing may be used for generating the back and forth flow of simultaneously the buffer solution and the sample solution. In this respect it is further preferred that the back and forth flow means comprise a back and forth moving actuator, such as a piston or pressure unit. In this way the back and forth flow may be generated using a piston or a pressure unit. Such pressure unit may exercise a pressure on the tubing, thereby generating in the tubing the back and forth flow of sample and buffer, and also of the separation fluidum.

A relatively simple measuring system is obtained when the sensor surface comprises two or more different active sites. Accordingly, the back and forth flow means are integrated in the liquid transportation means, so that the back and forth flow is directly generated in the liquid transportation means.

As stated above, the measurement requires the monitoring of a change in signal, such as an acoustic or optical signal, like a shift of the SPR angle that is the shift in the resonance angle of light incidence. This change is dependent on an increase, or decrease of material mass or conformational change at the sensor surface and/or due to the presence at the sensor surface of a sample, buffer, regeneration liquid, and can be used for calculating a change (shift in the surface plasmon resonance angle of light incidence) at the sensor surface. The monitoring may take place with individual optical means, such as photodiode or camera. However, a common camera may be used for monitoring the surface plasmon resonance angle of light incidence of one the sensor surface or a plurality of sensor surfaces. Still, it is preferred that the plurality of flow cells uses separate sampling means but common transportation means and/or means for generating the back and forth flow. This results in a reliable SPR measuring system and also in a possibility of real time and at the same time monitoring of a change in the surface plasmon resonance angles of light incidence at the sensor surface in various flow cells. However, if in relation to a sample various target compounds are to be measured, then it is preferred that the sensor surface comprises two or more different active sites. These individual active sites may then be monitored by separate optical means or by a common camera monitoring different individual active sites present on the sensor surface of one or more flow cells.

It may be required that the sample to be measured is a reaction product. Accordingly, it is then preferred that the sampling means comprise a unit for mixing sample with a reagent.

As indicated above the measurement may be sensitive to temperature changes. In order to avoid an influence of temperature on the measurement it is preferred that a thermostatic unit is present for the sample, the buffer, washing, mixing and/or calibration solutions, which will be in contact with the sensor for measurement during the back and forth movement. Such thermostatic unit is suitable for maintaining the temperature of the sample and/or buffer at a constant temperature ±0.1° C., preferably ±0.01° C., more preferably less than ±0.01° C. In an example of such a thermostatic unit, the so called thermo-head, the liquid that enters the flow cell is first passed through the thermohead that comprises a thermal conducting block with a channel structure that can have a specific length of channels or tubing and therefore can hold a specific volume of liquid and that is precisely maintained at a specific temperature. The comprised volume of liquid in the tubing in the thermohead is chosen such that the liquid that enters the flow cell has the same temperature as the liquid in the flow cell. This prevents a bulk shift due to temperature differences of liquids that come into contact with the sensor surface.

A reliable and multi-functional measuring method is obtained when preferably the sensor surface comprises a plurality of active sites monitored individually for change in the surface plasmon resonance angle of light incidence at the sensor surface, preferably with a camera. It is noted that for QCM only one resonance frequency may be applied per sensor and for SAW currently about eight.

The measurement may be carried out in one single flow cell or in a plurality of flow cells. When a plurality of flow cells is used, then each flow cell may be served by its own pump means. However, it is preferred that the plurality of flow cell is served by common liquid transportation means such that all flow cells are subjected to the same conditions (flow rate and transport and passage of sample, buffer and separation fluidum) therefore making it possible to do a reliable automatic measurement in the plurality of flow cells.

It is noted, although not yet described, that it is often required to regenerate the active sites present in the flow cell after a sample measurement and the desorption measurement with buffer, then a regeneration fluidum may be aspirated after for instance the release of the sample from the measuring system, and subjecting the active sites to the regeneration medium For the SPR sensor may be used a glass substrate of 10×20 mm (thickness 1 mm) is provided by electron beam deposition with a gold layer (thickness 500 Å). An immobilization layer of polyethyleneoxide (PEO) is applied using thiol-C11-carcoxylate) (technology disclosed the article of E. A. Smith et al., JACS 125, 6140-6148, (2003). The PEO has a chemical functionality of a COOH group for binding to an NH2 group of an antibody for a specific antigen. Using a spotter, preferably a continuous flow micro arrayer, a sensor comprising several different ligand spots, and reference and blank spots can be applied.

When applied in an IBIS MX96SPR imaging instrument this sensor provided excellent results using specific ligands for the specific diseases to be tested on patient samples.

Mentioned and other features of the measuring system and of the method for measurement according to the invention will be further illustrated by various embodiments for a SPR measuring system of the invention, which embodiments are given for information purposes only and are not intended to limit the invention to any extent such as an SPR measuring system and method, or only label free sample detection, while making reference to the annexed drawings, wherein:

FIG. 1: a schematic presentation of a first measuring system according to the invention wherein the liquid transportation means comprises one pump;

FIG. 2: at a larger scale* detail II of FIG. 1;

FIG. 3: a schematic overview of an SPR measuring system of the invention;

FIGS. 4-1 to 4-11: the various steps of the SPR measurement with the SPR system shown in FIGS. 1 and 2.

FIG. 5: a schematic presentation of a second measuring system according to the invention wherein the liquid transportation means comprises two pumps;

FIGS. 6-1 to 6-11: a schematic overview other embodiments of the SPR measuring system shown in FIG. 5;

FIGS. 7-1 to 7-12: the various steps of the SPR measurement with the SPR system according to the invention of two samples consecutively;

FIG. 8: a part of a SPR measuring system according to the invention for measuring multi samples; and FIGS. 9A and 9B: a perspective view and a bottom view of a flow cell body according to the invention.

FIG. 1 discloses a measuring system 1 according to the invention in the form of a SPR measuring system 1. The system 1 comprises a sensor 2 which will be discussed in detail in relation to FIGS. 2 and 3. The sensor 2 is connected to a flow cell 3 having an inlet 4 connected to an inlet port 5 of the sensor 2, and an outlet 6 connected to an outlet port 7 of the sensor 2. The system 1 further comprises sampling means 8 comprising a sampling needle 9 connecting via tubing 10 to the inlet 4. The sampling means 8 and the flow cell 3 are connected to liquid transport means 11 via valve means 12. The inlet 4 is connected at a connection Y1 with an inlet parking line 13 and with the valve means 12. The outlet 6 is connected at a connection Y2 with an outlet parking line 14 and with the valve means 12. The outlet 6 is downstream of the connection Y2 connected via a combined line 15 with the valve means 12.

The valve means 12 comprise a switch unit 16 connected via a port A1 with the inlet parking line 13, via port A2 with the outlet parking line 14, and via an port N (Needle) with the combined line 15. On the other hand, is the switch unit 16 connected via a port B (Buffer) with a buffer unit 41. An inlet 70 of the switch unit 16 is connected to the transport means 11, having the form of a pump or piston. Furthermore, it is noted that the distance b between the outlet port 7 of the flow cell 3 and the connection Y2 is relevant in relation to back and forth means (not shown) for maintaining a back and forth movement during the measurement of either the sample or the buffer in the flow cell 2.

FIG. 2 shows more in detail the sensor 2 according to the invention. The sensor 2 is connected on the one side to a hemispheric or triangular prism 17, and on the other side to the flow cell 3. The flow cell 3 comprises a support 18 (for instance made of Delrin, a polyoxymethylene or PEEK, a polyether ether ketone). The sensor 2 is provided with several measuring locations 19-22, which are connected in series to the flow cell inlet 4, and to the flow cell outlet 6. The flow cell inlet 4 is connected via the tubing 10 and a sampler 23 to the sample needle 9.

The outlet 6 of the flow cell 3 is connected via the combined line 15 with the valve means 12. In the combined line 15 may be incorporated means for generating a back and forth flow 24 at the sensor surface 25. The sensor surface 25 is applied on a glass support 26 or the sensor surface 25 is integrated with the prism 17.

The sensor surface 25 is provided with the measuring locations 19-22 having the active sites 27-30, comprising different ligands specific for various target compounds that are potentially present in a sample 31.

Sample 31 is sampled with the sampler 23 and separated by separation fluidum 40 from buffer 32. The inlet parking line 13 and the outlet parking line 14 are filled with separation fluidum 40.

The sensor 2, the prism 17, and a flow cell body 33 incorporating the inlet 4 and the outlet 6 are present in a thermostatic unit 34, see FIG. 2. The unit 34 is controlled at a desired temperature such as 37.00°±0.01° C. In order to avoid temperature effects it is preferred that all liquids (sample, washing solution, calibration solution, buffer, and the like) are at the same temperature and subject to the back and forth flow over the sensor surface when measured or in the flow cell 3.

FIG. 3 shows more in detail the sensor 2 being part of the flow cell 3, and comprising the detection unit in the form of an optical unit 35. A source of polarized light 36 shines via the hemispheric or triangular prism 17 through the glass support 26 onto a gold metal layer 37 (50 nm) to the active sites 27-30 present at the measuring locations 19-22, respectively. The reflected light 38 from the evanescent field is monitored by a camera 39 which at the same time monitors the reflected light coming from all four active sites 27-30. As shown in FIG. 3, the SPR measurement of the sample 31 takes place while it is at the back and forth flow 24. In comparison to FIG. 2, in FIG. 3 the buffer 32 is removed out of the flow cell 3, and replaced by the sample 31 using the liquid transport means 11, and in a manner which will be discussed hereafter more in detail. FIG. 3 clearly shows that the sample 31 extends beyond the connection Y1 and the separation medium 40 extends beyond the connection Y2. However, if preferred the sample 31 may also extend beyond the connection Y2.

FIG. 4 shows in various steps the preferably label free measurement of at least one sample 31 according to the invention using a detection unit in the form of a sensor 2 for the measurement of at least one preferably label free parameter of a sample 31 caused by the interaction of compounds present in the sample 31 at the sensor surface 25 in the evanescent field of the sensor surface 25. FIG. 4-1 shows the flow cell 3 of the measuring system 1. The flow cell 3 comprises the tubing 10, inlet 4, sensor 2 outlet 6, and the outlet parking line 14 are filled with separation fluidum 40. In the alternative, with avoidance of the separation fluidum passes over the sensor surface 25, the outlet 6 and outlet parking line 14 may be filled with separation fluidum at the downstream side via the valve means 12 through an existing port or a separate air port of the switch unit 16.

The inlet parking line 13 and the parking line 14 as from the connection Y2 are filled with buffer 32. This filling configuration with separation fluidum 40 is possible by taking in separation fluidum 40 via the tubing 10 and sucking via the outlet parking line 14 towards the port A2 of the switch unit 16. According to FIG. 4-2, is the entire measuring system 1 filled with buffer 32 except for the outlet parking line 14 by supply of buffer from the port N of the switch unit 16. The liquid transport means 11 may be supplied with additional buffer from the buffer storage 41 via the port B of the switch unit 16.

According to FIG. 4-3, is separation fluidum 40 supplied to the tubing 10 via the needle 9 (not shown). This step is carried out by the liquid transport means 11 making contact with the tubing 10 via the outlet 6 and the inlet 4. Liquid transport in the inlet parking line 13 and outlet parking line 14 is not possible because these lines are closed off at the switch unit 16.

As shown in FIG. 4-4, is sample 31 taken up in the tubing 10 via the needle 9 separated from the preceding buffer 32 by the separation fluidum 40. The sample volume taken up is such that ultimately the sample fills flow cell between and slightly beyond the connections Y1 and Y2, see FIG. 4-7. In the situation of FIG. 4-4, a baseline measurement can be carried out for the buffer 32 present in the sensor 2 at the sensor surface 25 while carrying out a back and forth movement 24.

As shown in FIG. 4-5, sample 31 is taken up in the tubing 10 and separated by the separation fluidum 40 from the buffer 32. Liquid transport by the liquid transport means connected to the combined line 15, proceeds to the tubing 10 until the interface 42 between buffer 32 and separation fluidum 40 arrives at the connection Y1.

As shown in FIG. 4-6, the separation fluidum 40 is withdrawn from between the buffer 32 and the sample 31 via the inlet parking line 13. Also a pinched part 66 of the sample 31 is removed and taken up by the inlet parking line 13, whereby it is guaranteed that all separation fluidum 04 is removed. The separation medium 40 is withdrawn by the liquid transport means 11 via the port A1 of the switch unit 16. Separation fluidum 40 is withdrawn until there is no separation fluidum present in between buffer 32 and sample 31. Simultaneously, separation fluidum 40 is supplied via the sampler 23 and the tubing 10.

As shown in FIG. 4-7, the sample 31 is followed by separation fluidum 40 and is transported up to (and preferably slightly beyond) the connection Y2. The interface 43 is thereby at or beyond the connection Y2. Then, as shown in FIG. 4-8, separation fluidum 40 is supplied via the outlet parking line 14 connected via the port A2 of the switch unit 16 to the liquid transportation means 11, and inserted between the sample 31 and the buffer 40 and the pinched sample part. The combined line 15 and the air parking line 13 are closed off, so that the supply of separation fluidum 40 via the outlet air parking line 14 is possible by a flow of liquid towards the open tubing 10.

As shown in FIG. 4-9, the SPR measurement of the sample 31 as the sensor surface 25 is now carried out under back and forth flow 24 while mixing with buffer is not possible because there is a separation between buffer 32 and sample 31 in the outlet 6, whereas in the inlet 4, the sample 31 is in contact with the separation fluidum 40.

After the measurement of the sample 31, as shown in FIG. 4-10, the separation fluidum 40 is removed from in between the buffer 32 and the sample 31 in the outlet 6 by removal via the outlet parking line 14 connected to the port A2 of the switch unit 16. Having removed the separation fluidum 40, the system may be flushed as shown in FIG. 4-11 by supply of buffer 32 via the combined line 15 so that the whole system is flushed but separation fluidum 40 is maintained in the inlet air parking line 13 and in the outlet air parking line 14. If present and desired, the pinched part of the sample present in the outlet parking line may first be reintroduced into the outlet 6.

In the alternative, the measuring system 1 may be flushed by at high speed flushing both sample 31 and separation fluidum over the sensor surface 25 towards the needle line 10 and out of the system via the needle 9, after the measurement shown in FIG. 4-9.

The system is then in the situation as shown in FIG. 4-6 for reintroduction of a new sample.

It is noted, that in order to avoid that during the back and forth movement of the measurement of the buffer and of the measurement of the sample (see FIGS. 4-4 and 4-9) that any separation fluidum 40 may reach the sensor surface 25, because the distance b between the sensor surface and the connection Y2 is sufficiently larger than the volume of the separation fluidum.

FIG. 5 shows another SPR measuring system 45 according to the invention in which the transportation means 11 comprise two liquid transport pumps or liquid transport pistons 46 and 47 connected via an inlet 48 to a switch unit 49, respectively 50 of the valve means 12. The switch unit 49 has a port B connected with the buffer storage 41, a port C connected to the inlet parking line 13, and a port N connected to a connector 51. Similarly, is the switch unit 50 connected via the port C to the inlet parking line 14, by the port B to the buffer storage 41, and by the port N to the common connector 51. The common connector 51 is connected to the combined line 15.

In the same manner as disclosed in relation to the measuring system 1, and illustrate by the related FIGS. 6-1 to 6-11, the same steps for carrying out the measurements of the sample 31 while being separated by a separation fluidum 40 from the buffer 32, whereby both sample 31 and buffer 32 are measured under back and forth movement without mixing between sample 31 and buffer 32, and without any contact of the separation fluidum 40 with the sensor surface 25. For the various steps, the connection of the inlet parking line 13, the outlet parking line 14 and the combined line 12 with the liquid transport means 11, via either the switch unit 49 or the switch unit 50 are clearly identified in the FIGS. 6-1 to 6-11.

FIG. 7-1 to FIG. 7-12, shows the SPR measurement system 1 or 45 according to the invention in which a method for preferably label free measurement of two samples 56 and 57 is illustrated. In this measurement the two samples 56 and 57 are measured immediately after one another. Accordingly, it is possible with the first sample 56 to bind to the sensor surface a ligand or active molecule which is subsequently to be reacted with an analyte present in the second sample 57. Examples are so called concatenated assays, such as sandwich assays, in which after binding of for instance an antigen takes place, the binding of an antibody or competitive binding of antibodies, and the like. As shown in FIG. 7-1, the system 1, 45 is filled with buffer 32 as described hereinbefore. Subsequently, as shown FIG. 7-2, separation fluidum 40 is sampled into the tubing 10 by liquid transport means 11 connected to the combined line 15. Then, as shown in FIG. 7-3, the second sample 57 is sampled and taken up in the tubing 10 adjacent the separation fluidum 40. The volume of the sample 57 is such that during the eventual measurement the liquid space between the connections Y1 and Y2 is filled with sample 57. Separation fluidum 41 is resupplied to the tubing 10, so that the second sample 57 is flanked by separation fluidum 41. This train of the second sample 57 flanked by separation fluidum 41 is now transported into the inlet parking line 13 until the separation fluidum 40 is to leave or has left the inlet 4 at the connection Y1, see FIG. 7-4. So the second sample 57 is taken up first while the sample 56 that will be injected first will be taken up secondly.

Thereafter, the inlet 14 is filled with buffer 32 supplied via the combined line 15, FIG. 7-5 and the tubing 10 can be washed with buffer while the sample is stored in parking line 13. The first sample 56 is supplied as described above in relation to FIGS. 7-2 and 7-4. That is, flanked by separation medium 40. At the connection Y1, the preceding separation medium 32 is removed in taken up by the inlet parking line 13, see FIGS. 7-6 and 7-7. The first sample 56 is now in direct contact with the buffer 32, and transported into the sensor 2 and in contact with the sensor surface 25. The volume of the first sample 56 is such that the liquid volume between the connections Y1 and Y2 is filled with sample 56, see FIG. 7-8. When the first sample 56 is at, or has passed the connection Y2, then separation medium 40 is reintroduced via the outlet parking line 14, between the first sample 56 and the buffer 32, see FIG. 7-9. In this situation the measurement under back and forth movement (see double arrow) may take place. After the measurement, the second sample 57 is reintroduced into the inlet 13 downstream and in contact at the interface 58 with the first sample 56, as shown in FIG. 7-10. The second sample 57 is transported into the sensor 2 and in contact with the sensor surface 25. Due to the small diameters of the inlet 4, the sensor 2, and the outlet 6, and due to the small transport distance substantially no mixing will occur between the samples 56 an 57. The sample 57 fills the liquid space between the connections Y1 and Y2, with the interface 58 at, or just beyond the connection Y2, see FIG. 7-11. The separation medium 40 is reinserted between the samples 56 and 57, via the outlet parking line 14. Thereafter, the SPR measurement is carried out, see FIG. 7-12. Accordingly, both samples 57 and 56 are measured one after the other without separation fluidum passing over the sensor surface 25. Having completed the measurement of both samples 56 and 57, the system 1, 45 is cleaned and flushed as described hereinbefore.

FIG. 8 discloses another SPR measuring system 59 according to the invention with which it is possible to measure directly one after another or separated by an intermediate dissociation step or cleaning step samples 60, 61 or 62, without intermediate supply of the samples via the inlet sample needle 9 and tubing 10. The sample that is filled first in the sample parking lines will be injected last. The system 59 according to the invention is thereto provided with sample parking lines 63-65 connected to the inlet parking line 13. In the same configuration as shown in FIGS. 7-4 and FIG. 7-5, the sample parking lines 63-65 are filled with samples 60-62 flanked by separation medium 40. The amount of the samples 60-62 is such that during measurement the liquid space between the connections Y1 and Y2 is filled with sample.

The samples 60-62 can be measured either directly after one another, or indirectly after a dissociation or flushing/cleaning step at the sensor surface 25 without supply via the sample needle 9, as described hereinbefore. When measured directly one after the other, than it is preferred that samples are measured starting from the connection Y1, thus sample 60 is measured first, followed by sample 61 and finally sample 62, thereby minimizing sample contamination Finally, shows FIGS. 9a and 9b a special configuration of flow cell 3 in combination with the flow cell body 33. The inlet 4 is connected to the inlet port 5 of the flow cell 3, and the outlet 6 is connected to the outlet port 7 of the flow cell 3. The inlet 4 comprises at the connection Y1 an inlet parking line 13 having remote an insert 66 with a larger diameter for connection to a tubing. Similarly, at connection Y2 is the inlet 6 connected with the outlet parking line 14 also ending in an insert 67 of larger diameter for connection to the tubing 10. The inlet parking line 13 and outlet parking line 14 may be horizontal or slightly upwardly inclined towards the inlet 4 and the outlet 5, respectively.

Although described in the embodiments of the invention in relation to measurement by SPR, it is also possible to use any other measuring system for measurement of samples which may comprise a label or are label free.

The invention claimed is:

1. A system for measurement of at least one sample, comprising:
   at least one sensor having at least one sensor surface;
   at least one flow cell which is in liquid contact with the at least one sensor surface,
   wherein the at least one flow cell comprises:
      a flow cell inlet connected to an inlet port of an upstream part of the flow cell; and
      a flow cell outlet connected to an outlet port of a downstream part of the flow cell;
   sampling means connected via first tubing to the flow cell inlet, wherein the sampling means is configured to supply at least one sample and separation fluid to the first tubing filled with a buffer such that the at least one sample is separated from the buffer by the separation fluid;
   handling means configured to handle the separation fluid upstream of the at least one sensor surface of the at least one sensor, wherein the handling means comprises an inlet parking line connected at a first connection to the first tubing between the sampling means and the flow cell inlet for handling the separation fluid upstream of the at least one sensor surface; and
   transport means connected via second tubing to the flow cell outlet,
   wherein the transport means is connected to the flow cell inlet via the inlet parking line,
   wherein the transport means is configured to transport the at least one sample, the separation fluid, or the buffer through the first tubing, the second tubing, and the at least one flow cell, and
   wherein the handling means is configured to remove the separation fluid from in between the at least one sample and the buffer from the first tubing in the upstream part of the flow cell.

2. The system according to claim 1,
   wherein the handling means further comprises an outlet parking line connected at a second connection to the second tubing between the flow cell outlet and the transport means,
   wherein the outlet parking line is configured to handle the separation fluid downstream of the at least one sensor surface, and
   wherein the handling means is further configured to:
      handle the separation fluid upstream of the at least one sensor surface;
      handle the separation fluid downstream of the at least one sensor surface; and
      insert the separation fluid in between the at least one sample and the buffer in the second tubing in the downstream part of the flow cell.

3. The system according to claim 2, wherein the handling means is further configured to remove the separation fluid from in between the at least one sample and the buffer from the second tubing in the downstream part of the flow cell.

4. The system according to claim 1, wherein the transport means is configured for a back and forth movement of liquids, and wherein a distance of the second connection to the outlet port of the flow cell is such that, during the back and forth movement, the separation fluid will not contact the at least one sensor surface.

5. The system according to claim 4, wherein the distance is such that a volume between the second connection and the outlet port is greater than:
 a volume of the separation fluid between the at least one sample and the buffer; and
 a stroke volume of a back-and-forth stroke.

6. The system according to claim 5, wherein a sample volume is larger than a liquid volume between the first connection and the second connection.

7. The system according to claim 1, further comprising
 at least one sample parking line connected to
 the inlet parking line.

8. The system according to claim 1, further comprising a detection unit configured to measure at least one parameter of the at least one sample caused by interaction of the at least one sample at the at least one sensor surface in a field of the at least one sensor surface, wherein the system is a surface plasmon resonance measuring system, and wherein the detection unit is an optical unit for measuring a surface plasmon resonance angle of light incidence at the at least one sensor surface.

9. The system according to claim 1, wherein the at least one sensor surface comprises binding ligands which selectively capture a target compound.

10. The system according to claim 1, wherein removing the separation fluid from in between the at least one sample and the buffer from the first tubing upstream of the flow cell comprises taking up some of the buffer, the separation fluid, and some of the at least one sample.

11. The system according to claim 2, wherein inserting the separation fluid in between the at least one sample and the buffer into the second tubing downstream of the flow cell comprises tuning to a front of the at least one sample by pinching off a mixing/diffusion region of an interface between the at least one sample and the buffer.

* * * * *